Jan. 8, 1963 R. L. JAESCHKE 3,072,811
ELECTRIC COUPLING
Filed Nov. 18, 1959 2 Sheets-Sheet 1
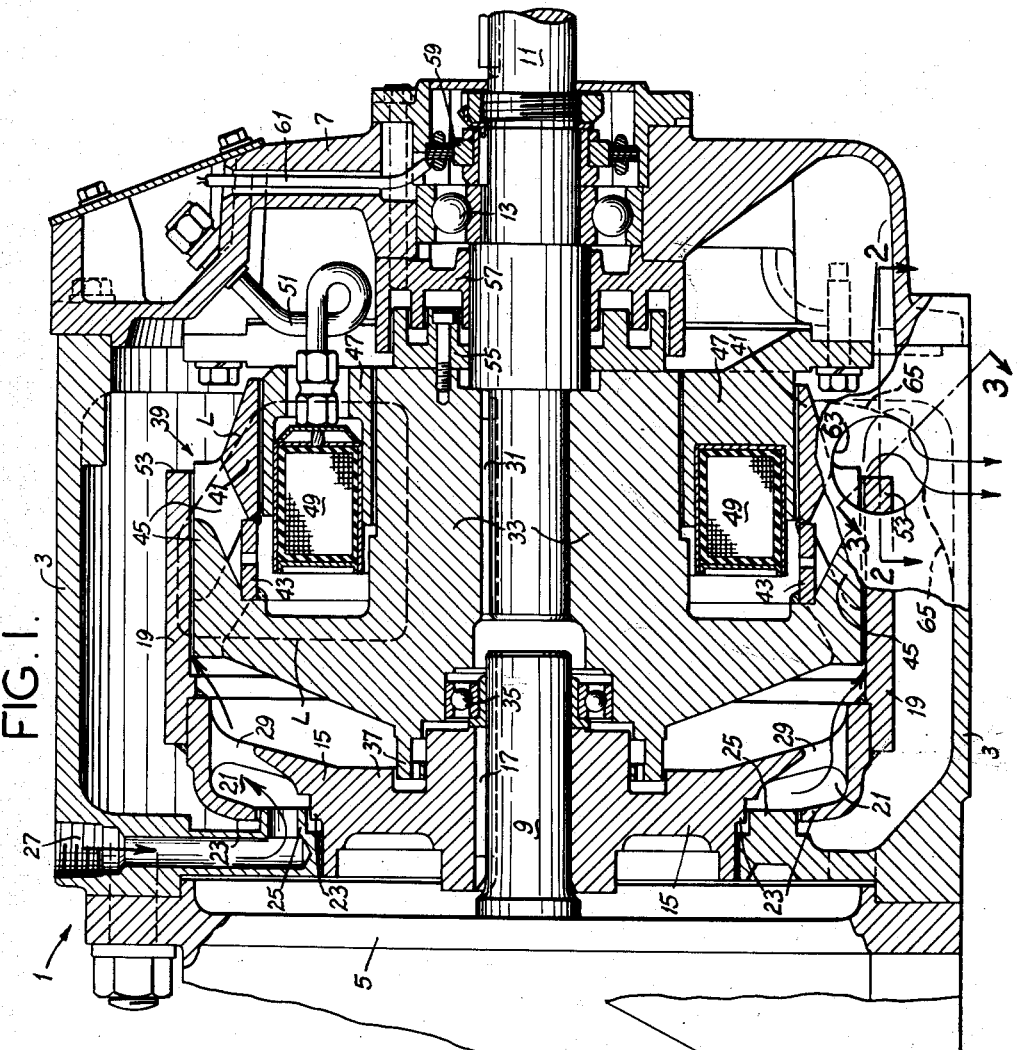
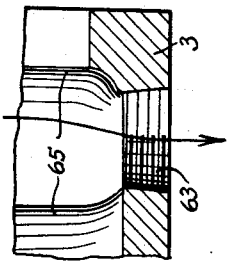
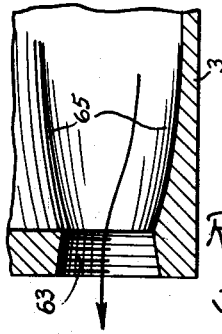
Ralph L. Jaeschke
Inventor
Koenig and Pope,
Attorneys.

Jan. 8, 1963   R. L. JAESCHKE   3,072,811
ELECTRIC COUPLING
Filed Nov. 18, 1959   2 Sheets-Sheet 2
FIG. 4.
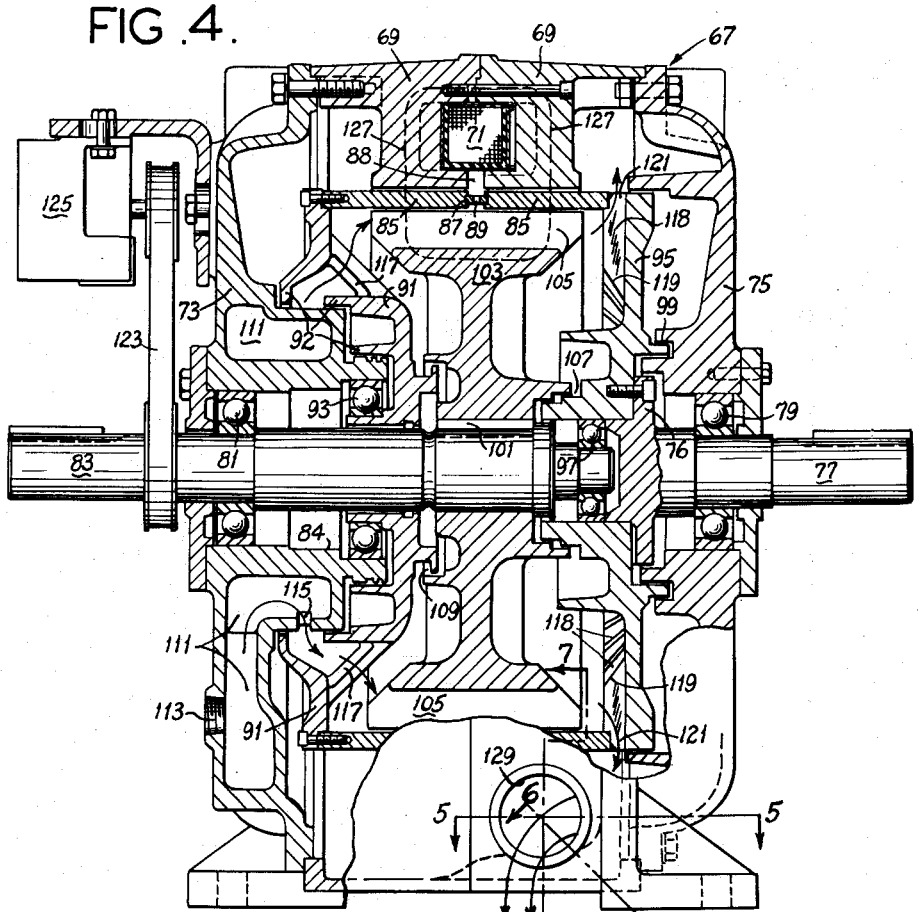
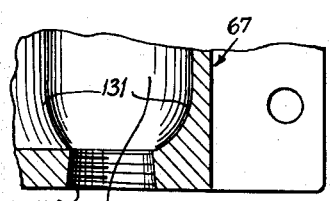
FIG. 5.
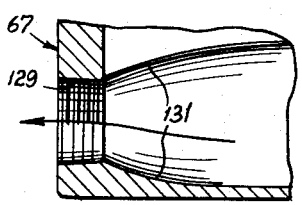
FIG. 6.
FIG. 7.
Ralph L. Jaeschke,
Inventor.
Koenig and Pope,
Attorneys.

United States Patent Office 3,072,811
Patented Jan. 8, 1963

3,072,811
ELECTRIC COUPLING
Ralph L. Jaeschke, Kenosha, Wis., assignor to Eaton Manufacturing Company, Cleveland, Ohio, a corporation of Ohio
Filed Nov. 18, 1959, Ser. No. 853,897
4 Claims. (Cl. 310—105)

This invention relates to electric couplings, sometimes referred to as electric clutches, and with regard to certain more specific features, to water-cooled couplings of this type, being an improvement upon structures such as shown in United States Patents 2,855,527 and 2,871,383.

Among the several objects of the invention may be noted the provision of water-cooled couplings, of both the so-called single-support and double-support types in which the rate of flow of water coolant is improved, thereby improving coupling performance, the provision of couplings of this class in which retention of excessive amounts of water in the housings of the couplings is avoided; and the provision of such couplings in which water damage to bearings is minimized, thereby improving bearing life. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is an axial section, parts being in elevation, illustrating the invention as applied to a so-called single-support coupling;

FIGS. 2 and 3 are enlarged cross sections taken on lines 2—2 and 3—3, respectively, of FIG. 1;

FIG. 4 is an axial section, parts being in elevation, illustrating the invention as applied to a so-called double-support coupling; and, FIGS. 5, 6 and 7 are enlarged cross sections taken on lines 5—5, 6—6 and 7—7, respectively, of FIG. 4.

Corresponding reference characters indicate corresponding parts throughout the several views of the drawings.

The basic types of couplings upon which the present invention is an improvement are shown in said Patents 2,855,527 and 2,871,383, the former showing a so-called single-support arrangement and the latter a so-called double-support arrangement. Herein, FIGS. 1-3 concern the single-support cast and FIGS. 4-6 concern the double-support case. Full details of both the single-support and double-support structures are shown in said patents. Brief descriptions of the same herein will suffice to exhibit the structural relationships to which the present invention applies.

Referring now more particularly to FIG. 1, there is shown at numeral 1 a water-tight casing consisting of a central housing 3, enclosed at its ends by closure members 5 and 7, respectively, the former supporting a drive shaft 9 and the latter a driven shaft 11, carried in bearings 13. The member 5 may also be a part of an associated driving motor (not shown).

Keyed to the drive shaft 9 is a spider 15 (see key 17). The spider supports a cylindrical eddy-current inductor drum 19, composed of a conductive material such as, for example, iron or steel. The spider includes a circuliar trough 21, arranged with running seals 23 in connection with a stationary annular boss 25, forming part of the housing 3. The sealing means 23, 25 is of the free-running type, having close running fits without packing. A water inlet 27 in the housing delivers water through the boss 25 to the trough 21, from which it is centrifugally forced out through openings 29 into the inside of the eddy-current drum 19, along which it progresses from left to right for ultimate escape from its open margin 53.

Keyed to the driven shaft 11 at key 31 is a magnetic field pole member 33. A pilot bearing 35 is located between drive shaft 9 and the field member 33. Close-running sealing means 37 is provided between members 15 and 33 without interposed packing. Marginally, the member 33 carries a magnetic pole assembly 39, consisting of a ring 41 supported on the field member by a nonmagnetic ring 43, the members 33 and 41 carrying interdigitated polar teeth or poles 45.

Closure member 7 has bolted to it a ring-shaped magnetic support 47 for an annular field coil 49. Electrical connections for exciting the field coil are shown at 51. When the field coil 49 is excited, a toroidal magnetic loop, a half section of which is diagrammed by the dotted line L interlinks the field member and the inductor drum 19. Upon relative rotations between members 33 and 19, eddy currents will be generated in the drum 19, whereby a magnetic slip coupling is obtained therebetween. The eddy currents cause heating of the drum, which therefore is required to be cooled. The coolant (water) passes along the inside of the drum through a small gap between it and the poles 45 of the field member, being finally centrifugally ejected at the margin 53 of the drum. Interdigitated labryinth sealing rings 55 and 57 are attached to the field member 33 and the closure member 7, respectively, these also having close running fits without packing.

A tachometer type of generator 59, driven by shaft 11, supplies current over a line 61 and is suitably connected with the exciting circuit for coil 49 to control excitation in accordance with the speed of the shaft 11. Electrical circuits for this purpose are known and require no description herein. It suffices to say that the excitation of coil 49 increases with decrease in speed of the shaft 11 and vice versa, thus performing a speed-regulating function on shaft 11.

From the above it will be apparent that when the clutch is in action, cooling water will gather in the casing 1, requiring an outlet therefor. Heretofore difficulties have occurred in attempts to protect bearings such as 13, 35 and the bearings for the shaft 9 in closure 5 by the desirable simple packless type seals such as (55, 57), (37) and (23, 25). This is because the necessary water outlets for the casings were treated simply as drains. With their use as such, a water level tended to build up within the casing 1, so that flooding might occur through the free-running seals into the bearings. There are of course complicated packing types of seals which might avoid this bearing flooding condition, but I have discovered that the chief cause of these difficulties is the drain means employed. Hence the necessity for use of such packings to protect the bearings is not required according to the present invention, although their use as an added precaution would not be excluded. It may be mentioned that their use on large radii is troublesome because of the high rubbing velocities involved on such radii.

Referring to Patent 2,855,527, the outlet 79 is adjacent the closed end of the eddy-current drum therein. According to the present invention, I first place the water outlet 63 in a plane including the margin 53 of the drum 19 where the centrifugally spinning water leaves the drum. I also form the casing I adjacent the outlet 63 in streamline form, as illustrated in FIGS. 2 and 3 at numeral 65 tangentially to receive water spun out from the drum 19 in a tangential direction. Thus the stream of water is flung outward, spiraling radially and tangentially outward from the lip or margin 53 adjacent the outlet 63 assumes a streamline flow directly into this outlet. The result is a rapid efflux action at high velocity through the outlet which maintains the water in the casing at a lower level than can be obtained by employing the outlet as a mere drain, as in Patent 2,855,527, for example.

Referring now more particularly to FIGS. 4–6, application of the invention to a double-support type of machine will be described. In this form, numeral 67 in general indicates the casing, consisting of two magnetic rings 69, bolted together and adapted to support a central annular exciter coil 71. At the ends of the assembly 69 are bolted closure members 73 and 75. A drive shaft 77 is supported in a bearing 79 within the closure member 75. Supported upon a bearing 81 in the closure member 73 is a driven shaft 83. At 85 are indicated coaxial inductor drum-forming cylinders joined by magnetic ring 87, in which are holes or openings 89 located in the plane of coil 71 across a gap 88. Ring 87 is thin enough to restrict magnetic flux therethrough. It is preferably non-magnetic.

Bolted to the left end of the drum assembly 85 is a spider 91 which is supported upon a bearing 93 carried in a hub 84 of the closure member 73. At 92 are shown close-running preferably packless seals between members 91 and 73. Welded to the other end of the drum assembly 85 is an enclosure disc 95 which is bolted to a flange 76 on the shaft 77. Between member 95 and shaft 83 there is located a pilot bearing 97. Between member 95 and the closure member 75 is a free-running seal 99.

Keyed to the shaft 83, as shown at 101, is a field pole member 103 having axially disposed pole-forming teeth 105 adjacent the inner surface of the inductor drum assembly 85. A seal 107 is located between members 95 and 103, and seal 109 between the members 91 and 103.

The end closure member 73 is hollow, as indicated at 111, and has a water inlet 113 and a water outlet 115 adapted to deliver water through openings 117 in the member 91 at the interior of the drum assembly 85. In order to permit escape of this water, the margin of the closure member 95, where it is welded to the drum assembly 85, is provided with spaced radial turbine impeller blades 118, beveled as shown at 119 and forming outlets 121 between them. At numeral 123 is indicated a belt drive extending from the shaft 83 to a tachometer generator 125. This controls an exciter circuit (not shown) for coil 71. When excited, a toroidal flux field interlinks members 69, 85 and 103 (all of which are magnetic), said loop being illustrated by dotted lines 127. In operation, the shaft 77 drives the doubly supported drum assembly 85. Since the loop at 127 is polarized by the teeth 105, eddy currents are generated in the drum assembly 85, with resultant heating. The reactive flux field drives the field member 103 and therefore also driven shaft 83. Water flowing through the drum assembly 85 is centrifugally forced against its inside and progresses to its outlets 121, where it is centrifugally accelerated and forcibly pumped out radially and tangentially by the turbine blades 118.

In order to prevent the water which is pumped out into the casing 67 from rising to an unduly high level therein, an outlet port 129 is located as close as possible to and in a plane normal to the plane of outward centrifugal movement of the water from the outlets 121. The inside of the casing 67 is streamlined, as indicated at 131 in FIGS. 5 and 6, to receive the outwardly spinning water and guide it tangentially toward the outlet 129, with high velocity. The resulting action tends to limit the water level in he casing 67 to a value which will not flood the bearings 79, 81, 93, 97 through the sealing members 92, 99, 107, 109. Some of the water which escapes from the drum assembly 85 passes out through the openings 89, tending to cool the coil 71 in its progress into the casing 67.

It will be apparent that in both forms of the invention the advantage accrues of employing the centrifugal and tangential spin of the water leaving the inductor drum for forcibly driving it along a streamlined trajectory to the outlet. This distinguishes from former methods of draining these machines, wherein the outlet was formed simply as a drain operative primarily by gravitational force. By organizing the position of the outlet as disclosed herein, centrifugally forcing the water, and tangentially streamlining it to the outlet, the desired out-pumping or what may be called an aspirating action is obtained, tending to hold down the water level in the casing.

It will be observed that in the form of the invention shown in FIG. 1, the outlet 63 is in the ideal position in the plane of centrifugal spiral release of the coolant from the outlet of the drum 19. In the case of the FIG. 4 form of the invention, it is desirable to have the outlet 129 in the plane of the centrifugally functioning blades 118, but to place it exactly in the desired plane would involve unduly lengthening the casing of the machine, which is undesirable. Therefore, the desired coplanar relationship is obtained as closely as possible, the streamlining form of the casing aiding the high-velocity, free flow desired. In the case of FIG. 1, the casing requires lengthening for other reasons, i.e., to provide supporting means for the coil 49.

In view of the above, it will be seen that the several objects of the invention are achieved and other advantageous results attained.

As various changes could be made in the above constructions without departing from the scope of the invention, it is intended that all matter contained in the above description or shown in the acompanying drawings shall be interpreted as illustrative and not in a limiting sense.

I claim:

1. An electric coupling comprising a casing, a hollow eddy-current drum and a field pole member which are relatively rotatable within the casing, said field pole member being within the drum bearing means between the drum, pole member and casing, means adapted to introduce coolant into one end of the drum for axial flow around the field pole member, the other end of the drum having peripherally disposed opening means adapted for centrifugal radial flinging movement of the coolant therefrom and tangentially into the casing, an outlet in the casing near the plane of said centrifugal movement of the coolant, said casing being formed adjacent the outlet for substantial streamline guidance of the coolant through the outlet.

2. An electric coupling comprising a casing, a rotatable eddy-current drum therein open at one end, supporting means for the drum located at its other end, said supporting means having coolant inlet opening means, a rotatable field pole member extending into the drum through its open end, bearing means for the drum and the pole member within the casing, means adapted to introduce coolant into the drum for movement therethrough and centrifugal exit from its open end into the casing, said casing having a coolant outlet therethrough located substantially in the plane of the open end of the drum, said casing being interiorly formed substantially in the plane of said drum outlet to guide the centrifugally moving coolant in a streamline flow into said outlet.

3. An electric coupling comprising a casing, a rotatable eddy-current drum therein, a rotatable field pole member within the drum, said drum having a support at one end containing inlet means adapted to admit coolant, an enclosing support at the other end of the drum, said drum having coolant outlet means adjacent said other end, impeller blades adjacent said outlet means, said casing having outlet means near the plane of movement of said coolant outlet means, said casing having an interior form adapted tangentially to streamline the movement to said outlet means of coolant emerging centrifugally from said impeller blades.

4. An electric coupling according to claim 3, including an annular field coil carried by the casing in a position surrounding the drum, said drum having coolant outlet means therethrough located in the plane of the field coil adapted for movement of water therefrom toward said coil.

References Cited in the file of this patent

UNITED STATES PATENTS

| | | |
|---|---|---|
| 2,428,634 | Nordstrum | Oct. 7, 1947 |
| 2,838,702 | Winther | June 10, 1958 |
| 2,871,383 | King | Jan. 27, 1959 |
| 2,915,655 | Baudry | Dec. 1, 1959 |

UNITED STATES PATENT OFFICE
CERTIFICATE OF CORRECTION

Patent No. 3,072,811 January 8, 1963

Ralph L. Jaeschke

It is hereby certified that error appears in the above numbered patent requiring correction and that the said Letters Patent should read as corrected below.

Column 2, line 4, strike out the comma; line 26, for "L interlinks" read -- L, interlinks --; column 4, line 50, after "drum" insert a comma.

Signed and sealed this 9th day of July 1963.

(SEAL)
Attest:

ERNEST W. SWIDER
Attesting Officer

DAVID L. LADD
Commissioner of Patents